(12) United States Patent
Jones

(10) Patent No.: US 7,047,245 B2
(45) Date of Patent: May 16, 2006

(54) PROCESSING SYSTEM

(75) Inventor: Andrew Michael Jones, Bristol (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 270 days.

(21) Appl. No.: 10/158,396

(22) Filed: May 30, 2002

(65) Prior Publication Data

US 2003/0061224 A1 Mar. 27, 2003

(30) Foreign Application Priority Data

May 30, 2001 (EP) .................................. 01304748

(51) Int. Cl.
*G06F 17/30* (2006.01)
(52) U.S. Cl. ...................................... 707/100; 707/200
(58) Field of Classification Search ................ 707/206, 707/205, 200, 8, 100
See application file for complete search history.

(56) References Cited

U.S. PATENT DOCUMENTS

| | | | |
|---|---|---|---|
| 5,247,684 A * | 9/1993 | Tavares et al. ................ | 707/8 |
| 5,737,600 A * | 4/1998 | Geiner et al. ................ | 707/200 |
| 5,778,394 A * | 7/1998 | Galtzur et al. ............... | 707/205 |
| 6,070,174 A * | 5/2000 | Starek et al. ................ | 707/206 |
| 6,360,219 B1 * | 3/2002 | Bretl et al. .................... | 707/8 |
| 6,480,849 B1 * | 11/2002 | Lee et al. ....................... | 707/8 |
| 6,510,437 B1 * | 1/2003 | Bak et al. .............. | 707/103 Y |
| 6,529,919 B1 * | 3/2003 | Agesen et al. ............... | 707/206 |
| 6,560,616 B1 * | 5/2003 | Garber ........................ | 707/203 |
| 6,560,619 B1 * | 5/2003 | Flood et al. ................. | 707/206 |
| 2002/0073082 A1 * | 6/2002 | Duvillier et al. ............... | 707/3 |

OTHER PUBLICATIONS

John D. Valois, Lock-Free Linked Lists Using Compare-and-Swap, Proceeding of the 14th Annual ACM Symposium on Principles of Distributed Computing, Aug. 1995, pp. 214-222.*

* cited by examiner

*Primary Examiner*—Greta Robinson
(74) *Attorney, Agent, or Firm*—Lisa K. Jorgenson; James H. Morris; Wolf, Greenfield & Sacks, P.C.

(57) ABSTRACT

A processing system which comprises means for storing a plurality of items defining a queue, pointer means having a first pointer and a second pointer associated with the beginning of said queue and a second pointer associated with the back of said queue; at least one writer for adding items to said queue; at least one reader for deleting items from said queue; and means for updating said second pointer when said at least one writer adds an item to said queue, said second pointer being updated by a swap operation.

23 Claims, 7 Drawing Sheets

PROCESSING SYSTEM

BACKGROUND OF THE INVENTION

1. Field of the Invention

The present invention relates to a processing system and in particular to a processing system having means for storing a plurality of items defining a queue.

2. Related Art

Queues are fundamental data structures and are known. For example, in a multi processor system, there will be a plurality of computer processing units (CPU) each of which may be executing a different stream of instructions simultaneously. Each stream is generally referred to as a thread. Each thread may wish to perform a queue operation on a queue data structure which resides in the memory of the system. When a plurality of threads attempt to access the system memory at the(same time, an arbiter will choose the order in which the requests are forwarded to the system memory. Generally, the arbiter controls the access in a manner which cannot be predicted in advance by any of the threads.

Multi threaded processors are also known. In a multi threaded processor, a CPU will execute several threads and, in particular, switches rapidly between the threads so that each thread appears to be executed concurrently with the other threads. Again, each of the threads cannot determine or predict the order of their execution with respect to the other threads. Accordingly, a multi threaded processor has to deal with the same problems relating to concurrent access as occur in the case where there are a number of processors.

A parallel queue is one which has a plurality of readers and/or a plurality of writers. It is often provided in operating systems where it facilitates resource sharing, Known implementations of parallel queues normally use a mutex or a spin lock to sequence access to the queue and ensure that it remains in well defined states. A mutex (mutual exclusion) is a software device which allows a processor exclusive access to a resource. Mutexes normally take the form of two procedures: get exclusive access and release exclusive access. The "get" routine returns true if it is successful in gaining access. Otherwise false is returned. False normally leads to "get" being retried at a later time. True enables the processor to use the resource until the processor opts to give up exclusive access with a release.

Spin locks are related to mutexes and use a lock bit to determine if the resource is free or not. A process will "spin" (i.e. repeatedly read a lock bit) until the lock bit indicates that it can acquire the lock. The disadvantage of using these two processed is that they do not allow for parallel operation very easily. Given multiple processors, these processes will allow only one, (or a limited number of) processors to access a resource.

Current implementations of parallel queues normally sequentialise access so that multi accesses to the system memory are not permitted. For large multi processor machines, this can be disadvantageous in that a bottle neck is formed. This makes the use of the known queues inefficient. A further disadvantage is that the performance achieved does not scale with the size of the machine. For example, with very large machines, this inefficiency may limit the performance for the entire machine.

It has been proposed to provide CPU architectures which have been designed to support multi processing and which use an atomic read-modify-write operation to implement data structures which permit scalable concurrent use. To implement this, algorithms are provided which use only use the more complex read-modify-write memory operations to implement the queue. These can include complex variations on the fetch-and-add primitives.

Fetch and acid primitives are a class of atomic read modify write operations which are popularly implemented on multiprocessor machines. The simplest is fetch and add one which atomically reads a memory word and increments that word by one. If, for example, the word at some address A contains the number 5, then the instruction fetch and add one would fetch the value 5 to the CPU register while leaving the value in A as 6. Furthermore it would not be possible for ally other device which had access to the memory to access A between the value 5 being returned but before it had been incremented to 6. This is the sense in which it is atomic.

Such primitives are costly to implement as they require arithmetic capability at the memory interface where there would otherwise be none.

The known arrangements use fetch and add primitives to implement queues because commonly multiprocessors provide such facilities which lead to very simple software. Thus, software simplicity is gained at the cost of hardware complexity and hence machine cost.

SUMMARY OF THE INVENTION

It is an aim of embodiments of the present invention to address one or more of the problems With the prior art.

According to a first aspect of the present invention there is provided a processing system comprising means for storing a plurality of items defining a queue, pointer means having a first pointer and a second pointer associated with the beginning of said queue and a second pointer associated with the back of said queue; at least one writer for adding items to said queue; at least one reader for deleting items from said queue; and means for updating said second pointer when said at least one writer adds an item to said queue, said second pointer being updated by a swap operation.

According to a second aspect of the present invention there is provided a processing system comprising means for storing a plurality of items defining a first queue, pointer means having a pointer associated with the back of said queue: at least one writer for adding items to said queue; means for updating said pointer when said al least one writer adds an item to said queue, said second pointer being updated by a swap operation, and said storing means being arranged to store a plurality of items defining a second queue, said items identifying which of a plurality of readers is associated with a corresponding item in said first queue.

For a better understanding of the present invention and as to how the same may be carried into effect, reference will now be made by way of example to the accompanying drawings in which:

DETAILED DESCRIPTION

Figure 1:
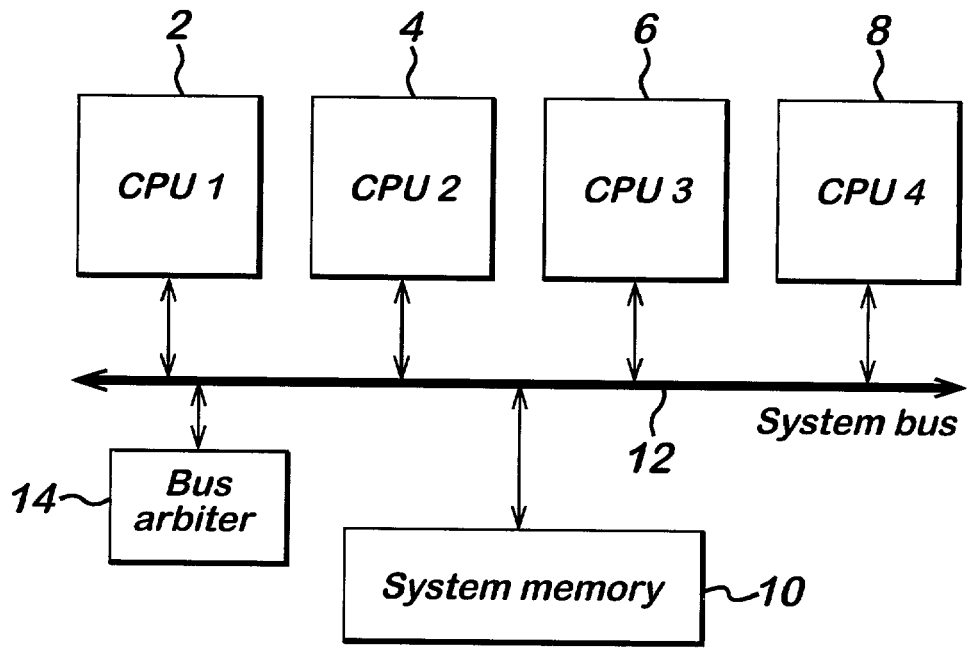
FIG. 1 shows a multi processor system with which embodiments of the present invention can be used.

Reference will now be made to FIG. 1, which shows a first system in which embodiments of the present invention can be incorporated. The system comprises four CPUs (computer processing units) 2–8 respectively. Each of these CPUs 2–8 is arranged to execute a different stream of instructions. Accordingly, up to four streams of instructions can be executed simultaneously via the four CPUs 2–8. Each stream is referred to as a thread. Each thread may wish to perform a queue operation on a queue data structure which resides in a system memory 10.

When a plurality of the threads, in other words when two or more threads from respective ones of the CPUs 2–8 attempt to access the system memory 10, a bus arbiter 14 chooses the order in which requests are forwarded to the system memory 10 via the system bus 12.

Figure 2:
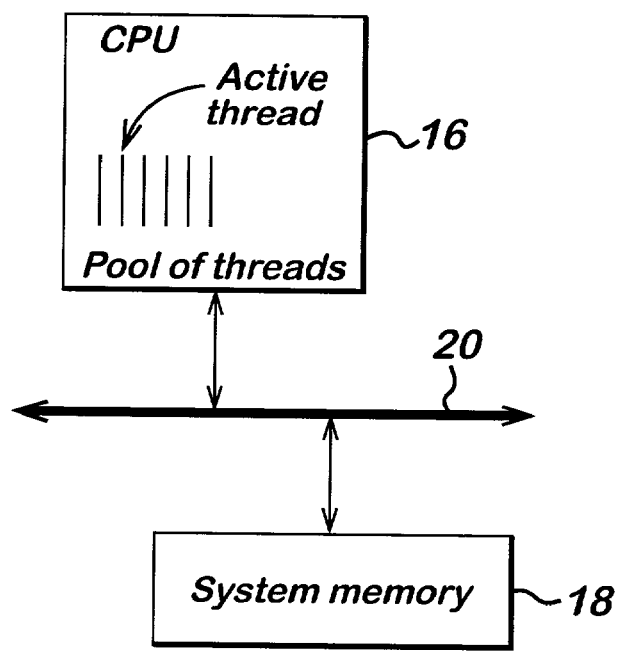
FIG. 2 shows a multi threaded system with which embodiments of the present invention can be used.

Reference is made to FIG. 2 which shows a multi threaded, single processor system. In this system, a single CPU 16 is provided. However, the single CPU 16 switches rapidly between several threads. The single CPU 16 controls the order in which the threads of the CPU 16 have their requests forwarded to the system memory 18 via the system bus 20.

Embodiments of the present invention can be implemented in either of the arrangements, shown in FIG. 1 or FIG. 2. In both cases the queues are implemented in the system memory.

It should be appreciated that in alternative embodiments of the present invention, two or more processors may provided, each of which is able to switch between several threads. It is also possible in alternative embodiments of the present invention that a plurality of CPUs be provided, at least one of which is able to process a number of threads and at least one of which is only able to process a single thread at a time.

A queue is a Data structure which supports two operations: insertion and deletion. Insertion is the action of adding an item to a queue and deletion is the action of removing an item from a queue. A queue has the property that deletion always removes the item from the queue which was least recently inserted: In other words, if data item X is inserted in the queue before data item Y then data item X will be deleted before data item Y is deleted.

Generally, a reader is a process which deletes items from a queue. A writer is a process which inserts items into a queue.

As will be described in more detail hereinafter, attempting deletion on an empty queue, that is one for which no items have been inserted or one in which all inserted items have been deleted, will result either in an error or will return a "null" response to the deletor.

A single reader, single writer queue, is one in which at most one process will attempt to insert data or at most one process will attempt to delete data from the queue.

A single reader, multiple writer queue is a data structure which allows an arbitrary number of writers to perform simultaneous insertions whilst a single reader sequentially performs deletions.

A multiple reader, multiple writer queue is a data structure which allows an arbitrary number of writers, to perform simultaneous insertions whilst multiple readers sequentially perform deletions.

A multiple reader, single writer queue is a data structure which allows a single writer to perform insertions whilst multiple readers perform deletions Embodiments of the present invention are particularly applicable to single reader, multiple writer queues, multiple reader, multiple writer queues and single writer, multiple reader queues. The single reader, single writer queue does not permit concurrent access to the queue and accordingly does not have the problems with which embodiments of the present invention are particularly concerned. However, embodiments of the present invention may be used with single reader, single writer queues if necessary.

Embodiments, of the present invention will now be described particularly in the context of the single reader, multiple writer queues. With this type of queue, the potential conflict between several writers wanting to add items to the queue concurrently need to be resolved.

Reference will be made particularly to FIG. 3 which shows queue states. The queue data structure used in embodiments of the present invention is a link list. A single reader looks after the top of the list which corresponds to the head of the queue and the multiple writers append items to the bottom of the list which corresponds to the tail of the queue.

Figure 3A:
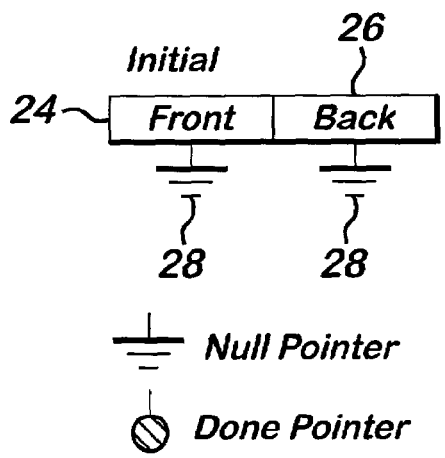
FIGS. 3*a*, 3*b*, 3*c* and 3*d* illustrates queue states.

The queue is provided with two pointers 24 and 26. In particular, there is a front pointer 24 which indicates the head of the queue and a back pointer 26 which indicates the tail of the queue. The front and back pointer each comprise two parts. The first identifies which item is at the front and back of the queue respectively and the second part identifies if the item pointed to is done, has a valid pointer or a null pointer. This is discussed in more detail hereinafter. Each item in the list contains a pointer to the next item on the list and the last item of the list contains a null pointer 28 which indicates that that item is the last item. Each item in the list contains the data to be read from the list and a painter slot which refers to the next item, a null pointer or a done pointer. Referring to FIG. 3 in more detail, FIG. 3a shows the initial state. Both the front pointer 24 and the back pointer 26 point to the same item and the null pointer as there is nothing in the queue.

Figure 3B:
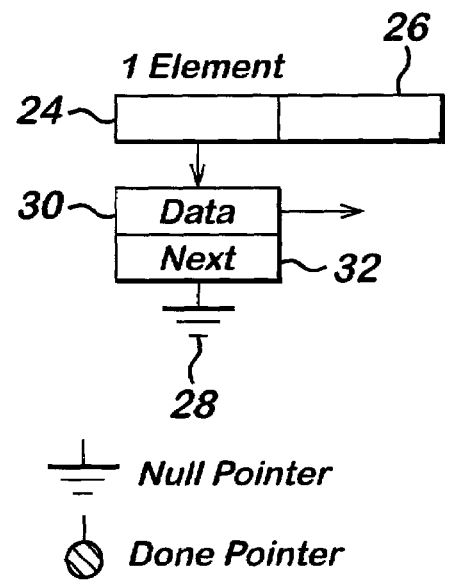

Referring next to FIG. 3b, this shows a list containing one item. The front pointer 24 refers to the first item 30. Likewise, the back pointer 26 also refers to the first and only item 30. The first item on the list is the only item and accordingly, the part of the item 32 which refers to the next item on the list points to the null pointer 28. The front and back pointer both contain the null pointer.

Figure 3C:
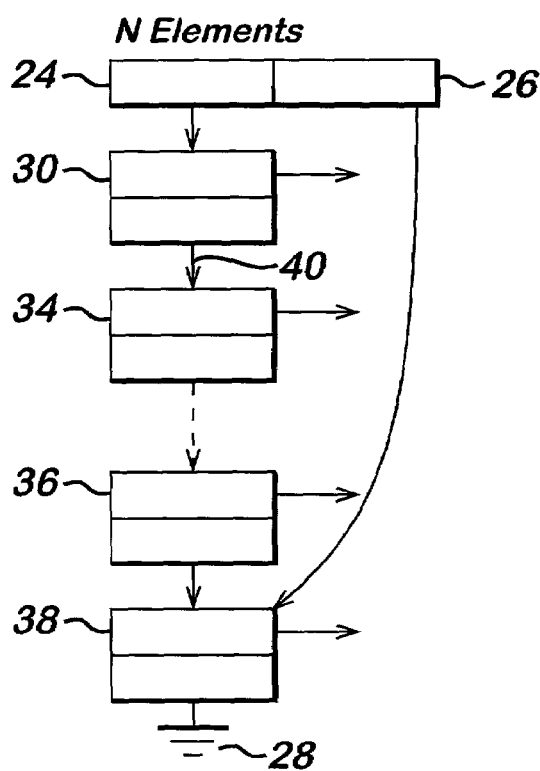

Reference is made to FIG. 3c which shows n items 30, 34, 36 and 38. The front pointer 24 refers to the first item 30 in the list. The back pointer 26 refers to the nth item 38 in the list. The first item 30 has a pointer 40 to the second item on the list. Likewise, the second item in the list 34 has a pointer to the next item on the list and so on, The n–1th item 36 has a pointer to the last item 38 in the queue. The last item 38, the nth item, has a null pointer 28. The front pointer has the value of the first item and a valid pointer whilst the back pointer has the value of the nth item and the null pointer.

Figure 3D:
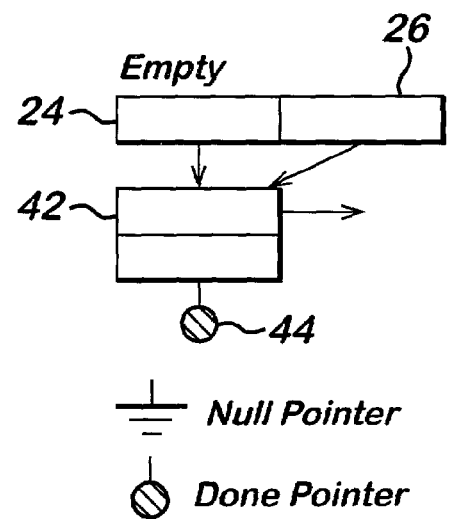

Reference is made to FIG. 3d which shows an empty queue. The front pointer 24 refers to the first and only item in the queue 42. Likewise, the back pointer 26 also refers to the first and only item 42 in the queue. The pointer of the first item 42 is a done pointer 44 which confirms that the first item has been removed from the queue and that the queue is empty. This done pointer is contained in both the front and back pointers.

Each time that a writer wants to add an item to the queue, a pointer to the item with the back pointer is swapped with the new item. The effect of several, for example n, writers doing this concurrently is to create an ordering on those n writers such that the kth writer where k is between 1 and n, receives a pointer to the kith writer where k is between 0 and n−1 and thereby inserts itself into the queue. The items are added to the queue in the order in which their associated swaps were received by the memory controller which controls access to the memory area in which the queue reside. Thus in some embodiments of the invention, the ordering has nothing to do with the identity of the writers themselves but rather is the result of a race between several swap-operations where more than one item is to be added at a time.

The swap operation is one which performs an atomic read-modify-write of a data item in the memory. This operation exchanges the value contained in a general purpose register of a processor with a word from the memory. The swap instruction takes three operands: an address of a word in memory, a source register and a destination register. For example, the instruction swap <regD><addr><regS> will cause the value in the word at address <addr> to be copied to register D and then the word in register S to overwrite the word at address <addr>. These two accesses occur atomically, that is without the possibility of any other intervening memory operations.

The initial stare is distinguished by either or both of the front and back pointers being null. The queue is empty if the pointer slot of the item pointed to by the back pointer has the value done in its field. The list is not empty if the front pointer points to the first item and the back pointer points to the last item on the list which has the value null in its pointer slot.

The front and back pointers are both single words of memory which, at any time contain one of the following three values: valid pointer; null pointer; done pointer in addition to identifying the respective item in the queue. The null pointer is conventionally given the value 0. There is no convention over the value of a done pointer but that value −1 may be used. A valid pointer can have any value which represents a valid system memory address. It should of course be appreciated that any other suitable system can be used to represent the above three values.

In embodiments of the present invention, two orderings are provided so as to avoid two rates Consider FIG. 1. If multiple processors execute a queue write operation at approximately the same time, then there is a "race" as to which order they will occur. If the queue write procedure is not robust then the write procedure of one processor will interfere with that of another and potentially leave the queue in an undefined and hence unusable state. To avoid this, the simultaneous writers and then the readers can access the queue in a manner which operates on the queue in the same way as if each write operation and read operation were separated in time by a long period so that there was only sequential access.

Firstly, the writers are ordered between themselves by swapping on the back pointer. The value in the back pointer is changed to point to the new item. The previous back of the queue has the value of the new item inserted into its pointer slot. Register D is the back pointer.

If the queue is not empty, the reader sequentially deletes items at its own rate. If the queue is empty, the reader deschedules itself, that is stops reading items. A writer which inserts an item into an empty queue causes the reader to be scheduled and thus start deleting items again.

A second ordering to be defined is that between, a reader having deleted the last item in the queue and hence making the list empty and a writer inserting and hence keeping a list non-empty. This is achieved by both reader and writer swapping on the field of the last item. The reader swaps the reserve value into this field and if it gets back the null value, it knows that the list is now empty. The reader is looking at the front pointer. Otherwise what it has got is a pointer to the head of the queue and the list is not empty. Meanwhile, the writer swaps a pointer to the inserted data item into this field. If it gets back the value done, then it knows that the list is empty, otherwise it gets the value null and knows that the list is non empty. The writer is looking at the back pointer.

This will be described in more detail with reference to FIGS. 4 to 7.

Figure 4:
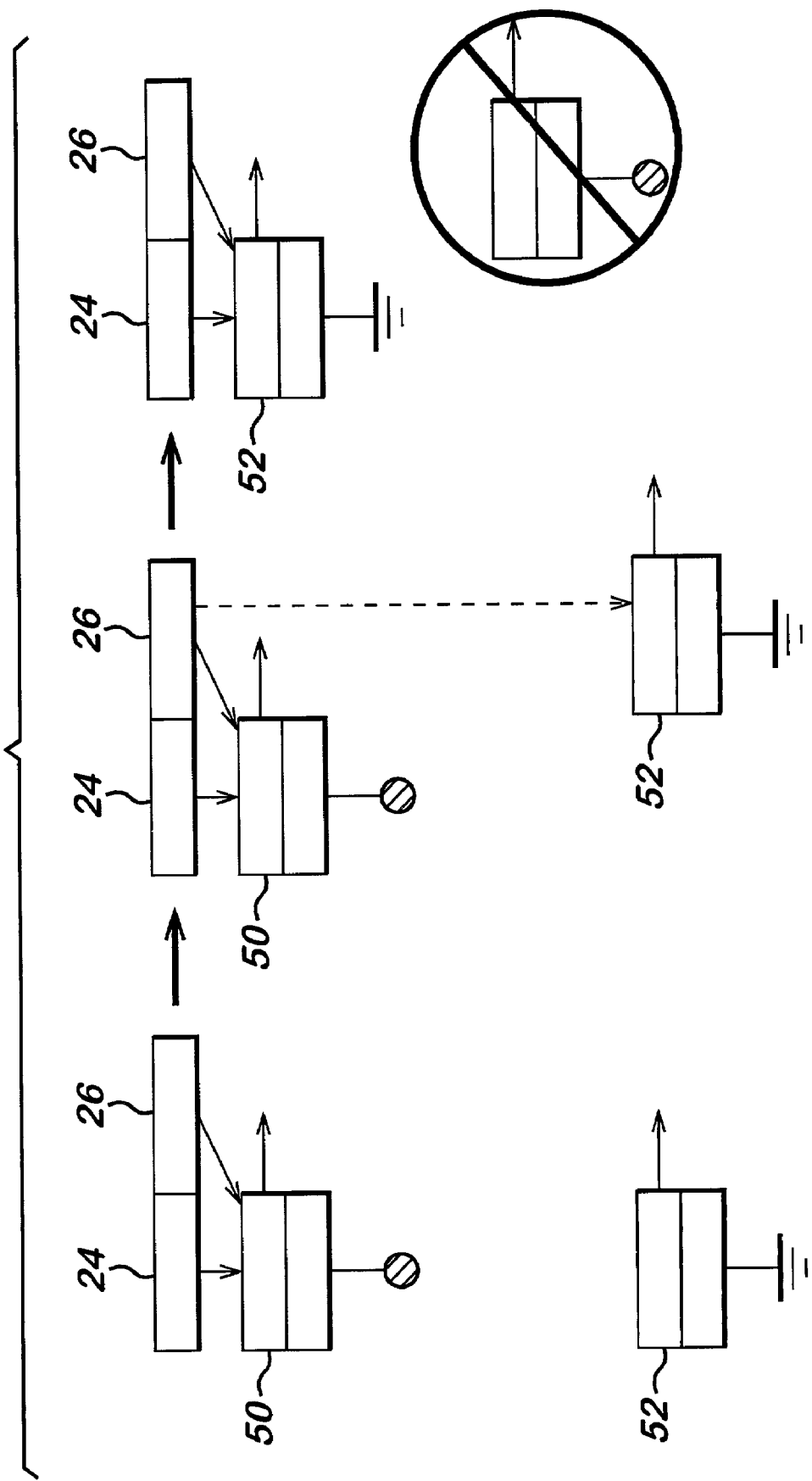
FIG. 4 illustrates the writing to an empty queue.

Reference is made to FIG. 4 which shows writing to an empty queue. Initially, there is a single item 50 in the queue. The pointer associated with that item indicates that the item has been done or deleted from the queue. The front pointer thus points to the item 50 and the back pointer 26 contains the value done. The front pointer will also contain the value done and the back pointer will point to the single item in the queue. Accordingly, the list is initially empty.

An item 52 is to be written into the queue. The value in the back pointer is now swapped with the pointer in the item 52 added to the queue. In the example shown in FIG. 4, the new item has the value null associated therewith Accordingly, the back pointer has the value null and the list is now not empty. In the third stage, the previously deleted item is removed so that the new item 52 is the only item in the list.

Figure 5:
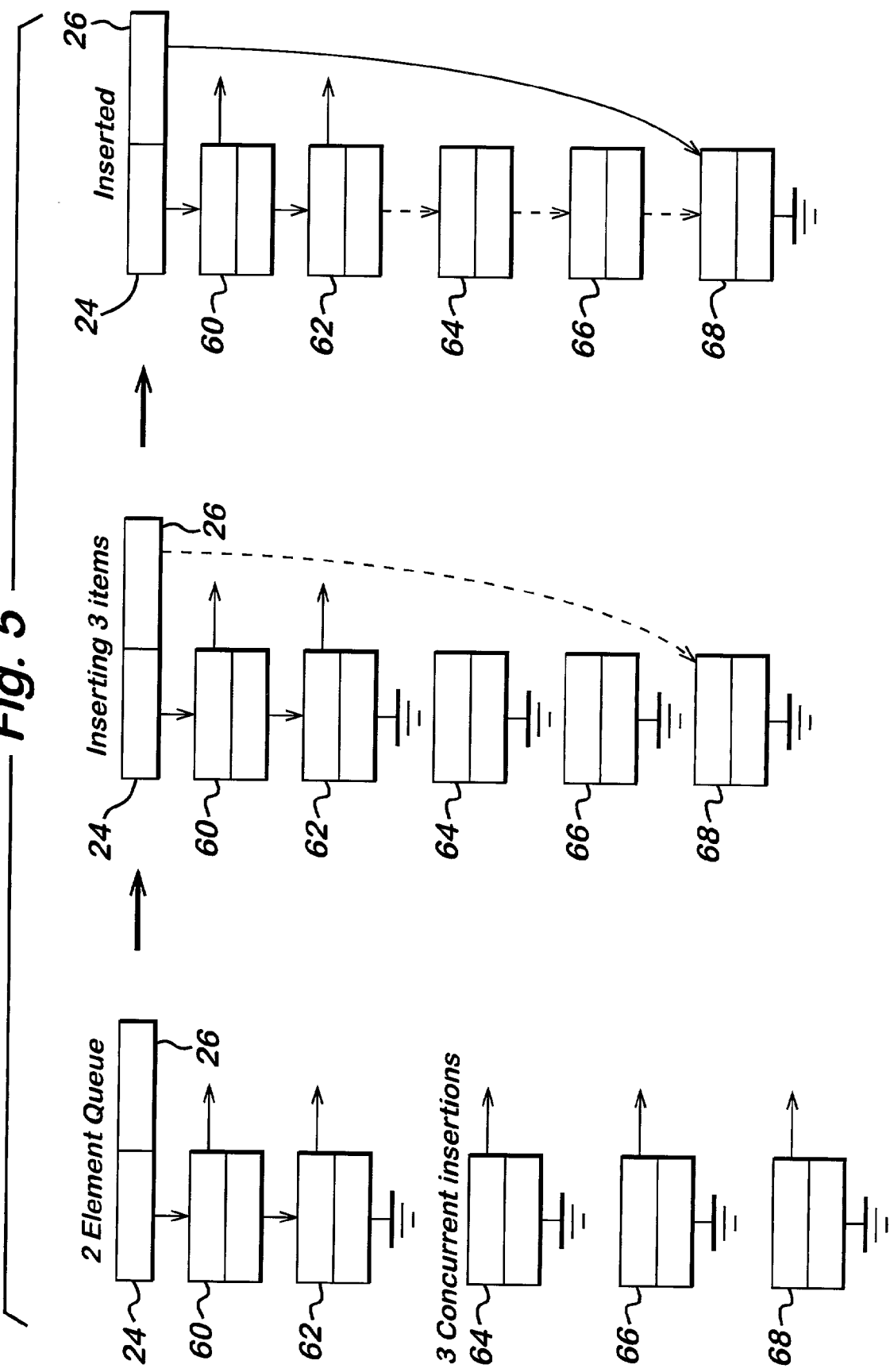
FIG. 5 illustrates the insertion of three items into a queue.

Reference is made to FIG. 5 which shows the insertion or writing of three items into the queue. Initially, the queue has two items 60 and 62. The front pointer 24 refers to the first item whilst the back pointer 26 points to the second item 62 and has associated therewith the null value. Three items 64, 66 and 68 are to be added at the same time to the list. In the next stage, the items are put in the queue. However, each of the second to fourth items has a null pointer. The back pointer 26 is arranged to swap with the fifth item, which is at the back of the queue. In the next step pointers between the items in the queue are established. In particular, the second item is arranged to point to the third item 64, the third item 64 is arranged to point to the fourth item 66 and the fourth item 66 is arranged to point to the fifth item. Thus, the three items have been successfully incorporated in the queue. Where three items are to be inserted into the queue at the same time, they will be inserted in a predetermined order depending on the identity of the writer. In alternative embodiments of the present invention, alternative methods may be used to control the order in which the items are added to the queue.

Figure 6:
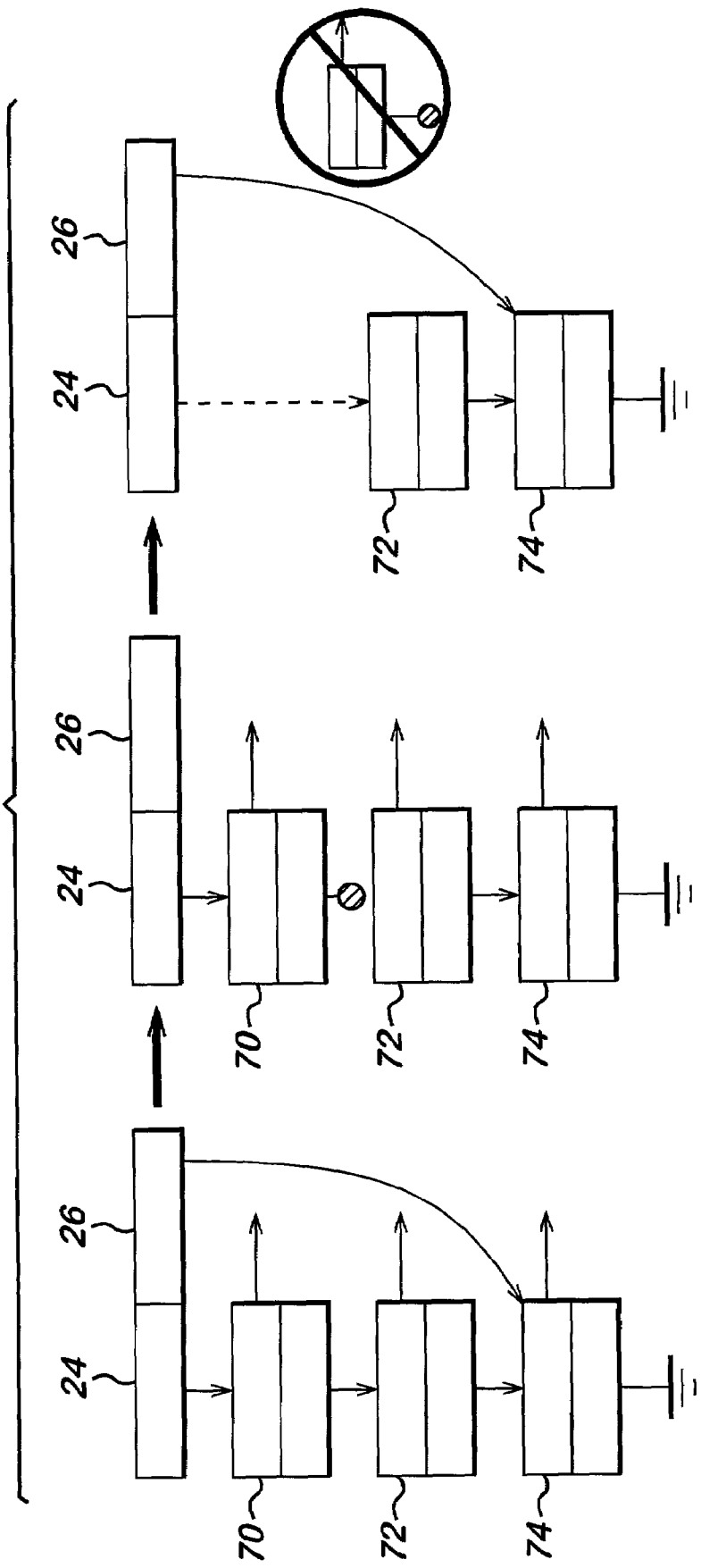
FIG. 6 shows the deletion of an item from a queue.

Reference will now be made to FIG. 6 which shows the reading or deletion of an item from a queue. Initially, the queue has three items 70, 72 and 74. The front pointer points to the first item 70 whilst the back pointer 26 points to the third item 74 and has the null value associated therewith.

In the next step, the first item 70 is deleted and the pointer associated with the first item has the done value. In the next stage, the front pointer 24 is updated to point to the new first item 72 in the list. This was previously the second item. No change is required to the back pointer as the item which was previously the third item is still at the bottom of the queue.

Figure 7:
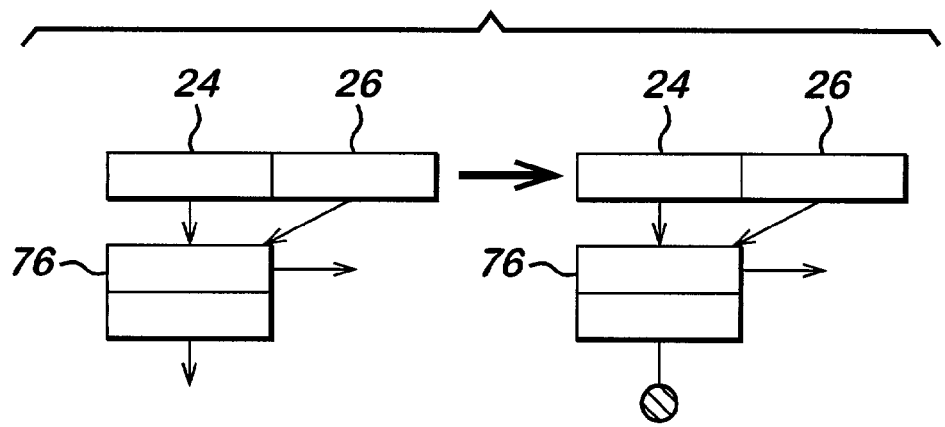
FIG. 7 shows the reading of the only item in a queue.

Reference is now made to FIG. 7 which shows the reading of the only item in the queue. The queue consists of a single item 76. This item is pointed to by the front pointer 24 as well as the back pointer 26.

When the only item 76 is deleted, the front pointer will remain unchanged. However, the back pointer will have the value done associated therewith. Accordingly, it can be identified that the queue is now empty.

Reference is now made to the following code:

```
1   #DEFINE NULL 0         /* invalid pointer value */
2   #DEFINE DONE -1        /* invalid pointer value */
3   struct node [
4        char *data ;           /* points to data area */
5        struct node *next ;    /* the next node in the list */
6   ];
7   swap(addr,datum)
8   int  *addr ;
9   int  datum ;
10  [
11       int temp ;
12       temp = *addr ;
13       *addr = datum ;
14       return (temp) ;
15  ]]
16
17  static struct node *Back = NULL ;
18  static struct node *Front = NULL ;
19  void delete( )
20  {
21       struct node *successor ;
22       deschedule( ) ;        /* sleep until rescheduled */
23       for( ;) {
24            consume(front->data) ;
25            successor = swap(front->next,DONE) ;
26            if (successor==NULL)
27                      deschedule( ) ;
28            else
29                      front = successor ;
30       }
31
32  }
33  void insert (text)
34  char *text; /* the data to be written */
35  {
36       struct node *item;          /* allocation omitted */
37       struct node *PrevBack ;
38       struct node *terminal ;
39
40       item->data = text ;
41       item->next = NULL ;
42       PrevBack = swap(Back,item) ;   /* make back point to
                                          item */
43       if (PrevBack != NULL) {        /* queue has been used */
44            terminal = swap(PrevBack->next,item) ;
45            switch(terminal)
46                 case NULL           /* queue was non-
                                         empty */
47                      break;
48                 case DONE           /* queue was empty */
49                      front = item ;
50                      reschedule(reader) ;
51                      break ;
52                 default             /* queue is invalid */
53                      exit (1) ;
54            }
55       else {                         /* list in initial state */
56            front = item ;
57            Run(reader) ;
58       }
```

The code can be divided into three sections. Lines 1 to 18 provide a definition of a swap primitive and declarations. Lines 19 to 32 define the reader process routine whilst lines 33 to 58 define the writer process routine.

In the code, lines 7 through 15 provide a "C" like functional definition of the swap primitive. In the implementation, this function must be performed atomically. Lines 17 and 18 show the initial stage of the queue, as illustrated in FIG. 3*a* Lines 3 to 6 show the definition of a structure which represents the item to be held in queues. It comprises a data part and a pointer part. The pointer part indicates the next item in the queue.

The reader process routine and writer process routine use standard scheduling primitives deschedule and reschedule to control when the processes are active.

The reader process initially deschedules itself so that it is not executing i.e. deleting anything.—see line 22. When it is re-scheduled by a writer process inserting an item into the list, it executes a loop in which it first consumes the data at the front of the queue and then swaps the value done into the next field of the item structure. This loop can be seen in lines 23 to 30. If the previous value is null, then it can deduce that the consumed item was the last item in the queue and de-schedule itself. In the case where the previous value of the field is not null, then it points to another item on the list. The pointer to this item, called the successor, is copied into the front pointer in line 29 and the loop iterates to consume this, data item which is now head of the queue.

The writer process is described in lines 33 to 58 and describes how items are added to the queue. The item is declared and initialised in lines 34 to 41. One of the key operations is defined in line 42. Here a pointer to the item to be inserted is swapped witty the back pointer making this item the end of the queue. There are now two possibilities based on the state of the previous value of the back pointer. If it was previously null then the queue has moved out of its initial state as indicated in line 43. In line 44, the node which was tail of the list immediately prior to the inserted item has its next field made to point to the inserted item. This effectively adds the inserted item onto the end of the list. If this next field is null, then the queue was not empty and nothing more needs to be done. If on the other hand, this field has the value done, then the queue is previously empty. The writer can infer that the reader is de-scheduled and hence writes a pointer to its item into the front pointer making this item into the head of the queue before rescheduling this reader process in lines 49 and 50. In the event that the writer finds a queue in it initial state, line 55, it writes a pointer to its item into the front pointer (line 56) to make this item the head of the queue before running the reader process for the first time in line 57.

Figure 8:
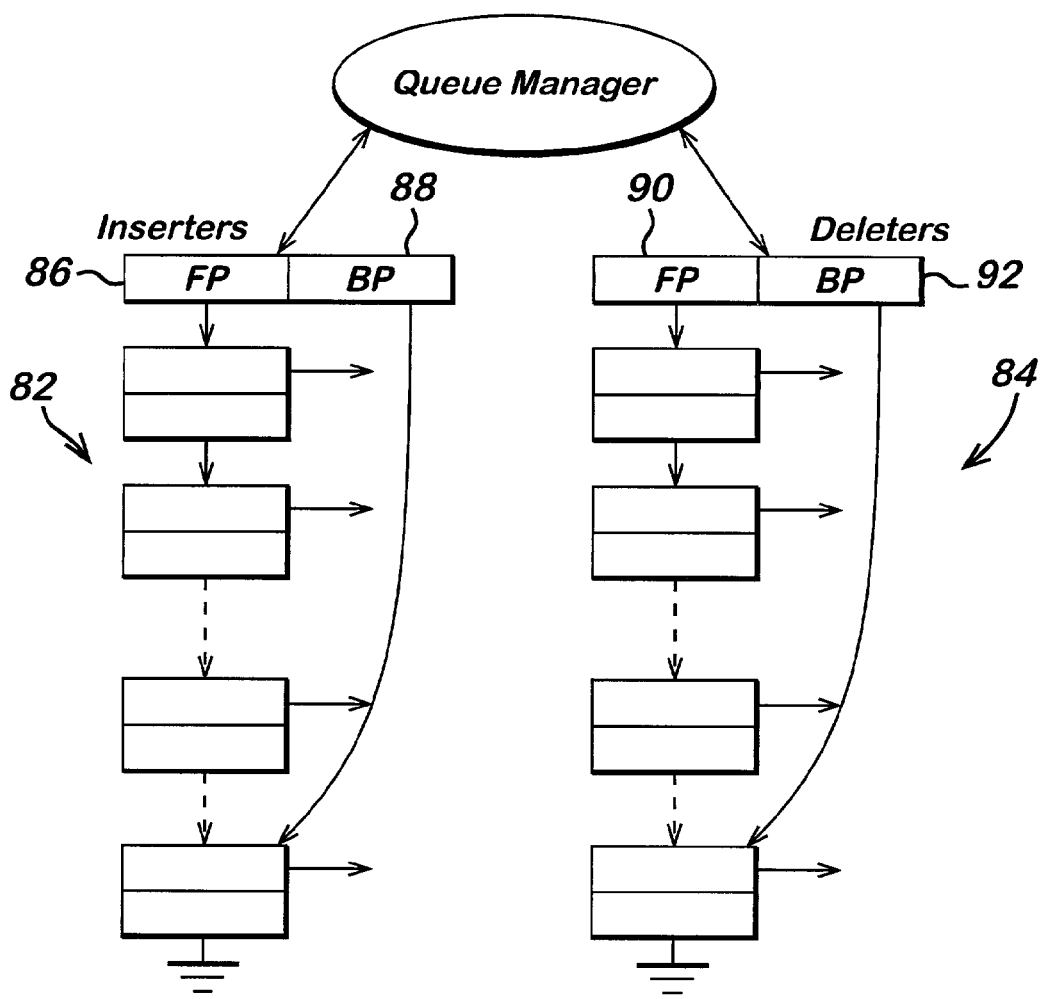
FIG. 8 shows multiple reader queues.

Reference will now be made to FIG. 8. The embodiments previously described have been in the context of single reader queues. Embodiments of the present invention can also be used with multiple readers. In one queue, writers insert data items and in the other queue, readers insert items whose data is the process identifier of the inserter.

The arrangement uses two queues, a reader queue and a writer queue. The reader queue is generally the same as the writer queue but where the writer queue holds data in each of the items of the queue, the reader queue holds information identifying the reader which wants to read the corresponding item in the writer queue. Thus the first item in the reader queue identifies the reader which want to read the first item in the writer queue and so on.

All modern operating systems whether they run on a multiprocessor or single processors maintain a list of processes which are sometimes referred to as threads or tasks. Each process is characterised by a program counter, the address from which it will execute its next instruction, a stack which contains its local data and a unique identifier. Many operating systems store all information relevant to a process in a stack. Therefor the stack pointer, that is its address in memory uniquely identifies the process and may be used for causing the process to run or pass data to the process. In other words the writer queue may include the stack pointer instead of data in one or more of its items.

Embodiments of the invention then arrange for the delete process of the writers queue and the delete process of the reader's queue to perform the marriage between the front of the queues. Thus the reader identified by the first item in the reader queue will read the information contained in the first item of the writer queue and so on.

A queue manager 80 is provided. Each queue 82 and 84 respectively has its own pointers. In particular, the queue for the inserters 82 has a front pointer 136 and a back pointer 88. Likewise, the queue 84 for the deleters has a front pointer 90 and a back pointer 92. The queue manager allows an arbitrary number of readers 20 and writers to concurrently use what it appears to be the same queue.

The queue manager 80 is the single reader of both the reader and writer queues. The queue reverence periodically removes a value from the writer (inserter) queue and removes a value from the reader (deletor queue). It now has data from the writer and the identity of the reader which wants it. It can now copy the data into the reader's area and, if the reader is descheduled, it can reschedule it.

Figure 9:
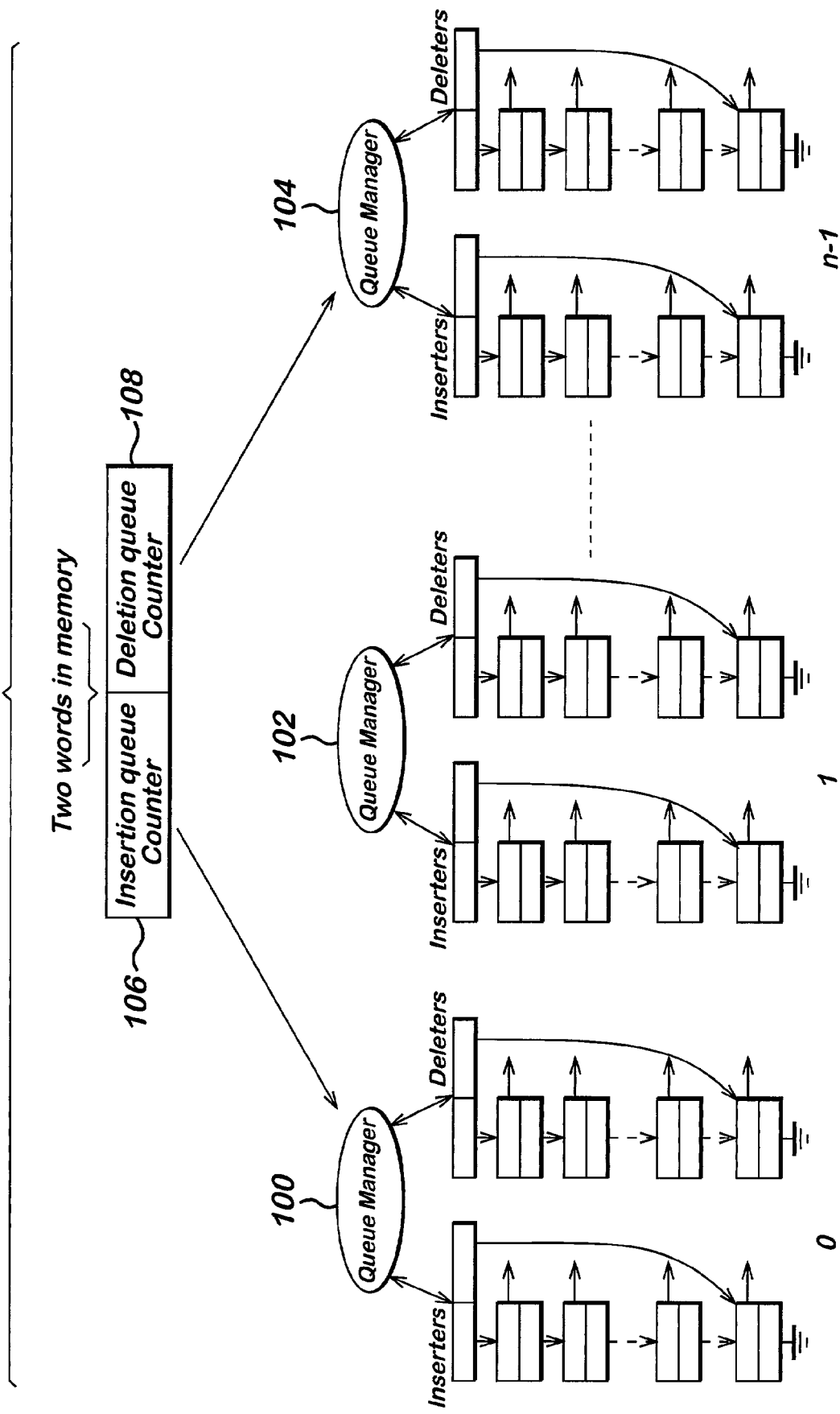
FIG. 9 shows scalable multiple reader, multiple writer queues.

Reference is now made to FIG. 9 which shows a modification to the arrangement of FIG. 8. In particular, a plurality of pairs of queues 100 to 104 are provided, each with its own queue manager. In relation to the embodiment shown in FIG. 8, the queue manager 80 pairs readers with writers sequentially and so provides a limitation on which data can be inserted and deleted. A scalable multiple reader, multiple writer linked to this can be implemented, as shown in FIG. 9. If for example, there are n processes, then n multiple reader lists (that is pairs of queues, one for the inserters and one for the deleters) is provided with its own queue monager for each proccessorSuccessive insert/delete requests are instructed to use consecutive queues. For example the first item goes to the first queue pair, the second item goes to the second queue pair and so on. This is achieved by defining two words—the insertion queue counter 106 and the deletion queue counter 108. An insertion operation first performs a fetch and add on the insertion queue counter. This modified operation refers to multiprocessors which both a swap and a fetch and add instruction. This allows the faster and simpler swap operation to be used most of the time and the fetch and add is only there to provide load balancing amongst multiple queues.

In alternative embodiments of the present invention a similar operation can be used. The fetched value (modular n) indicates which queue manager and by implication which queue pointers to use.

A delete operation performs the same operation in respect of the deletion queue counter. The two counters are initially zero and so a FIFO (first in first out) ordering is provided for the overall queue. If the word is 64 bits, then wrap around is not a concern as the word is so long that modularity in practice is not required. The scalability comes from the fact that the queue can handle n inserts and delete operations concurrently provided that they are not dealing with the same memory location at the same time. This is because the different queue pairs are able to operate in parallel.

It should be appreciated that the described embodiments of the invention can be modified to be used with multiple reader, single writer queues. The same principles as described previously would be used in such an embodiment.

The invention claimed is:

1. A processing system comprising:
   means for storing a plurality of items defining a queue, pointer means having a first pointer associated with a beginning of said queue and a second pointer associated with a back of said queue;
   at least one writer for adding items to said queue;
   at least one reader for deleting items from said queue; and
   means for updating said second pointer when said at least one writer adds an item to said queue, said second pointer being updated by a swap operation.

2. A system as claimed in claim 1, wherein a plurality of writers are provided.

3. A system as claimed in claim 1, wherein a plurality of readers are provided.

4. A system as claimed in claim 1, wherein said system comprises a plurality of processors.

5. A system as claimed in claim 4, wherein each processor is arranged to execute a stream of instructions, at least one instruction of which performs a queue operation in respect of said queue.

6. A system as claimed in claim 1, wherein said system comprises a multiprocessor.

7. A system as claimed in claim 6, wherein said multiprocessor is arranged to execute a plurality of streams of instructions, at least one instruction of which performs a queue operation in respect of said queue.

8. A system as claimed in claim 1, wherein at least one item is arranged to point to the next item in said queue.

9. A system as claimed in claim 1, wherein said at least one writer adds items to the back of said queue.

10. A system as claimed in claim 1, wherein said at least one reader removes items from the beginning of said queue.

11. A system as claimed in claim 1, wherein the last item in said queue is arranged to have a null pointer indicating that said item is the last item in said queue.

12. A system as claimed in claim 1, wherein said the last item in said queue is arranged to have a done pointer if the item has been read.

13. A system as claimed in claim 1, wherein at least one item comprises data to be read.

14. A system as claimed in claim 1, wherein at least one item comprises a pointer.

15. A system as claimed in claim 1, wherein a further queue is provided.

16. A system as claimed in claim 15, wherein said further queue is arranged is arranged to store the identity of a reader for reading an item in the queue.

17. A system as claimed in claim 16, wherein a queue manager is arranged to manage said queue and said further queue.

18. A system as claimed in claim 17, wherein said queue manager is arranged to remove items from said queue and said further queue.

19. A system as claimed in claim 1, wherein said queue is able to have at least one of the following states:
   initial state; empty state; and containing one or more items of data.

20. A system as claimed in claim 1, wherein at least one of said front and back pointers is arranged to store the identify of the item at the beginning and end of said queue respectively.

21. A system as claimed in claim 1, wherein at least one of said front and back pointers is arranged to store information on the status of said item.

22. A system as claimed in claim 21, wherein said status comprise information on if said item has been read.

23. A processing system comprising:
   means for storing a plurality of items defining a first queue, pointer means having a pointer associated with a back of said queue;
at least one writer for adding items to said queue;
means for updating said pointer when said at least one writer adds an item to said queue, said pointer being updated by a swap operation, and said storing means being arranged to store a plurality of items defining a second queue, said items identifying which of the plurality of readers is associated with a corresponding item in said first queue.

* * * * *